(12) United States Patent
Eom

(10) Patent No.: US 9,661,222 B2
(45) Date of Patent: May 23, 2017

(54) ELECTRONIC APPARATUS AND METHOD FOR CONTROLLING THE SAME

(71) Applicant: SAMSUNG ELECTRONICS CO., LTD., Suwon-si, Gyeonggi-do (KR)

(72) Inventor: Tae-won Eom, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 195 days.

(21) Appl. No.: 14/568,757

(22) Filed: Dec. 12, 2014

(65) Prior Publication Data

US 2015/0189179 A1    Jul. 2, 2015

(30) Foreign Application Priority Data

Dec. 30, 2013  (KR) .................. 10-2013-0167499

(51) Int. Cl.
*H04N 5/232*     (2006.01)
*H04N 5/76*      (2006.01)
(Continued)

(52) U.S. Cl.
CPC ..... *H04N 5/23245* (2013.01); *G06F 17/3028* (2013.01); *H04N 1/0097* (2013.01);
(Continued)

(58) Field of Classification Search
CPC ............... H04N 5/23245; H04N 5/232; H04N 1/00307; H04N 1/0097; H04N 1/4406;
(Continued)

(56) References Cited

U.S. PATENT DOCUMENTS 6,433,818 B1 *   8/2002   Steinberg ........... G07C 9/00142
                                                           348/161
6,670,933 B1 *  12/2003   Yamazaki ............. G06F 3/1454
                                                           340/4.62
(Continued)

FOREIGN PATENT DOCUMENTS

EP          2 009 906 A1     12/2008
KR     10-2007-0083290 A      8/2007
(Continued)

OTHER PUBLICATIONS

European Search Report issued for EP 14199753.6 (May 4, 2015).
Office Action issued for EP 14199753.6 (May 15, 2015).

*Primary Examiner* — Chia-Wei A Chen
(74) *Attorney, Agent, or Firm* — Drinker Biddle & Reath LLP

(57) ABSTRACT

Disclosed herein is a digital photographing apparatus which identifies a registered user and applies digital photographing apparatus setting information corresponding to the identified user and a method of controlling the same. The apparatus includes an input unit that receives user identification information; an identifying unit that identifies a user registered to the digital photographing apparatus based on received user identification information; a storage unit that stores setting information regarding the digital photographing apparatus corresponding to a user registered to the digital photographing apparatus; and a control unit that confirms setting information regarding the digital photographing apparatus corresponding to the identified user and applies a setting corresponding to the confirmed setting information to the digital photographing apparatus.

23 Claims, 15 Drawing Sheets

(51) Int. Cl.
*G06F 7/04* (2006.01)
*G06F 12/00* (2006.01)
*G06F 12/14* (2006.01)
*G06F 13/00* (2006.01)
*G06F 17/30* (2006.01)
*G11C 7/00* (2006.01)
*H04N 7/16* (2011.01)
*H04N 1/00* (2006.01)
*H04N 1/44* (2006.01)

(52) U.S. Cl.
CPC ....... *H04N 1/00307* (2013.01); *H04N 1/4406* (2013.01); *H04N 5/232* (2013.01); *H04N 5/23219* (2013.01); *H04N 5/23293* (2013.01)

(58) Field of Classification Search
CPC ........... H04N 5/23219; H04N 5/23293; H04N 1/00973; H04N 1/2112; H04N 1/4426; H04N 2201/0084; H04N 5/23203; H04N 1/00204; H04N 5/23216; H04N 2201/3205; G06F 17/3028; G06F 21/32; G06F 2221/2117; G03B 7/16; G03B 17/38; H04W 12/06
See application file for complete search history.

(56) References Cited

U.S. PATENT DOCUMENTS

| | | | | |
|---|---|---|---|---|
| 7,215,793 B2 * | 5/2007 | Takahashi | ......... | G07C 9/00158 382/100 |
| 7,327,387 B2 * | 2/2008 | Tanaka | ............... | H04N 1/00137 348/207.99 |
| 7,489,945 B2 * | 2/2009 | Iida | ................... | H04N 1/00127 455/456.1 |
| 7,515,825 B2 * | 4/2009 | Fujii | ..................... | G03B 17/02 348/333.01 |
| 7,895,368 B2 * | 2/2011 | Yamada | ........... | H04L 29/12113 710/4 |
| 8,154,608 B2 * | 4/2012 | Ishii | .................. | H04N 1/00127 348/211.1 |
| 8,269,846 B2 * | 9/2012 | Takaiwa | ............ | H04N 1/00925 348/207.99 |
| RE44,665 E * | 12/2013 | Pohja | .................... | H04B 7/000 340/539.1 |
| 8,675,084 B2 * | 3/2014 | Bolton | ................ | H04M 1/7253 348/211.1 |
| 8,717,444 B2 * | 5/2014 | Takasaki | ............ | H04N 1/00127 348/207.1 |
| 8,914,479 B2 * | 12/2014 | Parks | ..................... | G06F 3/1204 358/1.15 |
| 9,288,830 B2 * | 3/2016 | Okazaki | ................ | H04W 12/00 |
| 2002/0048460 A1 * | 4/2002 | Kitawaki | ............ | B60N 2/0228 396/429 |
| 2003/0027528 A1 * | 2/2003 | Hagiwara | ........... | H04W 52/288 455/66.1 |
| 2004/0051787 A1 * | 3/2004 | Mutsuro | ............ | H04N 1/00137 348/211.99 |
| 2004/0056972 A1 * | 3/2004 | Jang | ..................... | G06F 21/6245 348/333.01 |
| 2004/0109063 A1 * | 6/2004 | Kusaka | ............... | H04N 1/00244 348/207.1 |
| 2004/0174435 A1 * | 9/2004 | Kondoh | .............. | G06Q 20/105 348/211.99 |
| 2005/0001024 A1 * | 1/2005 | Kusaka | .............. | H04N 1/00281 235/375 |
| 2005/0071647 A1 * | 3/2005 | Fujinuma | ................ | G06F 21/32 713/186 |
| 2005/0185063 A1 * | 8/2005 | Ikehata | .................. | H04N 5/232 348/222.1 |
| 2005/0285944 A1 * | 12/2005 | Watanabe | .......... | H04N 1/00127 348/207.1 |
| 2006/0290790 A1 * | 12/2006 | Takaiwa | ............. | H04N 1/00925 348/231.99 |
| 2007/0109417 A1 * | 5/2007 | Hyttfors | ................. | H04N 5/232 348/211.99 |
| 2007/0286144 A1 * | 12/2007 | Miyake | ................. | H04M 1/7253 370/338 |
| 2007/0293193 A1 * | 12/2007 | Ramsten | ............. | H04M 1/2745 455/411 |
| 2008/0043110 A1 * | 2/2008 | Aizawa | ............... | H04L 12/2805 348/211.2 |
| 2009/0060293 A1 * | 3/2009 | Nagao | ..................... | G06F 21/32 382/118 |
| 2009/0079845 A1 * | 3/2009 | Yanagidate | ............. | G03B 7/16 348/222.1 |
| 2010/0066839 A1 * | 3/2010 | Azuma | ................ | G11B 27/034 348/207.1 |
| 2010/0302393 A1 * | 12/2010 | Olsson | ............... | G06K 9/00228 348/222.1 |
| 2011/0050926 A1 * | 3/2011 | Asano | ..................... | G06F 21/36 348/211.2 |
| 2011/0064396 A1 * | 3/2011 | Tanabe | .................. | G03B 7/091 396/49 |
| 2011/0115932 A1 * | 5/2011 | Shin | ........................ | H04N 5/232 348/211.4 |
| 2012/0282974 A1 * | 11/2012 | Green | ................. | G08B 13/19689 455/550.1 |
| 2013/0120591 A1 * | 5/2013 | Bednarczyk | .......... | H04W 48/18 348/207.1 |
| 2013/0188061 A1 | 7/2013 | Ellenby et al. | | |
| 2013/0286420 A1 * | 10/2013 | Tonegawa | ................ | H04N 1/44 358/1.13 |
| 2013/0298194 A1 * | 11/2013 | Nakajima | ............. | H04W 12/06 726/3 |
| 2014/0022980 A1 * | 1/2014 | Matsuda | ................ | H04W 48/18 370/315 |
| 2014/0184824 A1 * | 7/2014 | Matsuda | ................ | H04N 7/183 348/207.1 |
| 2014/0184830 A1 * | 7/2014 | Eom | ..................... | H04W 12/04 348/207.11 |
| 2014/0235955 A1 * | 8/2014 | Rao | ......................... | G06F 3/023 600/300 |
| 2014/0298434 A1 * | 10/2014 | Prchal | ................... | H04W 4/026 726/7 |
| 2015/0296118 A1 * | 10/2015 | Okazaki | .................. | H04B 5/02 348/211.99 |
| 2015/0339334 A1 * | 11/2015 | Hanke | ................ | G06F 17/30725 707/736 |
| 2016/0234400 A1 * | 8/2016 | Matsuda | ................. | H04N 7/183 |

FOREIGN PATENT DOCUMENTS

| | | |
|---|---|---|
| KR | 10-2010-0003918 A | 1/2010 |
| KR | 10-2011-0052385 A | 5/2011 |
| KR | 10-1261293 B1 | 5/2013 |

* cited by examiner

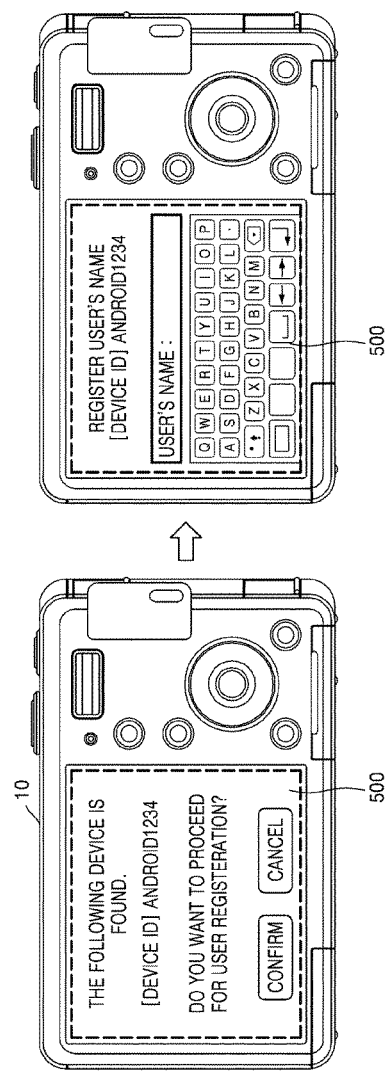

ELECTRONIC APPARATUS AND METHOD FOR CONTROLLING THE SAME

CROSS-REFERENCE TO RELATED APPLICATIONS

This application claims the priority benefit of Korean Patent Application No. 10-2013-0167499, filed on Dec. 30, 2013, in the Korean Intellectual Property Office, the disclosure of which is incorporated herein in its entirety by reference.

BACKGROUND

1. Field

One or more embodiments of the invention relate to an electronic apparatus (e.g., a digital photographing apparatus) and a method for controlling the same.

2. Description of the Related Art

Along with developments of technologies regarding digital photographing apparatuses, high-performance and high-spec digital photographing apparatuses are being introduced. A high-performance and high-spec digital photographing apparatus may store various setting information for using the digital photographing apparatus. It is very inconvenient and difficult for a general user, who is not a digital photographing apparatus expert, to remember such setting information or to set a digital photographing apparatus every time. Particularly, if a plurality of users share a single digital photographing apparatus, each person may prefer different setting information, and thus it is necessary to change setting information of the digital photographing apparatus, which is set to setting information of a previous user.

SUMMARY

One or more embodiments include an electronic apparatus (e.g., a digital photographing apparatus) which identifies a registered user and applies digital photographing apparatus setting information corresponding to the identified user and a method of controlling the same.

Additional aspects will be set forth in part in the description which follows and, in part, will become apparent from the description, or may be learned by practice of the presented embodiments.

According to one or more embodiments, a digital photographing apparatus includes an input unit that receives user identification information; an identifying unit that identifies a user registered to the digital photographing apparatus based on the received user identification information; a storage unit that stores setting information regarding the digital photographing apparatus corresponding to a user registered to the digital photographing apparatus; and a control unit that confirms setting information regarding the digital photographing apparatus corresponding to the identified user and applies a setting corresponding to the confirmed setting information to the digital photographing apparatus.

If the confirmed setting information differs from a current setting information regarding the digital photographing apparatus, the control unit changes the current setting information to the confirmed setting information.

If the confirmed setting information relates to photographing conditions, the control unit applies the photographing conditions when the digital photographing apparatus is in a photographing mode.

If the confirmed setting information relates to file storage setting, the control unit applies the file storage setting when the digital photographing apparatus stores a file.

The file storage setting may be a setting for automatically setting filenames of files stored in the digital photographing apparatus based on user information of the identified user.

The input unit may include a communication interface that receives device information regarding a mobile terminal from at least one mobile terminal operable to perform wireless communication with the digital photographing apparatus, and the identifying unit may identify a user registered to the digital photographing apparatus based on the received device information.

The digital photographing apparatus may further includes a user interface unit, which, if the communication interface receives a plurality of device information from a plurality of mobile terminals, displays user information corresponding to device information regarding identified users from the plurality of received device information and receives a selection for one of the plurality of displayed user information. The identifying unit may identify a user registered to the digital photographing apparatus based on the selected user information.

If the communication interface receives a plurality of device information from a plurality of mobile terminals, the control unit may determine reception sensitivities of the respective device information regarding registered users from the plurality of received device information and automatically selects device information regarding the mobile terminal with the highest reception sensitivity. The identifying unit may identify a user registered to the digital photographing apparatus based on the device information automatically selected by the control unit.

If no setting information regarding the digital photographing apparatus is stored in the storage unit, the control unit may receive setting information regarding a mobile terminal from the mobile terminal of an identified user and apply a setting corresponding to the received setting information to the digital photographing apparatus.

The control unit may transmit at least one parameter constituting the setting information regarding the digital photographing apparatus to the mobile terminal of the registered user, and, in response thereto, the control unit may receive setting information regarding the mobile terminal corresponding to the at least one parameter from the mobile terminal.

The input unit may include at least one unit selected from the group consisting of a recognizing unit that receives input of a fingerprint of a user and a photographing unit that receives input of a face image of a user. The identifying unit may identify a user registered to the digital photographing apparatus based on at least one piece of information selected from the group consisting of the fingerprint of the user and the face image of the user.

The digital photographing apparatus may further include an application executing unit that executes an user registration application installed on the digital photographing apparatus, and a user interface unit that receives user information corresponding to user identification information input via the input unit when the user registration application is executed. The control unit may store the user identification information and the user information in the storage unit as a user profile.

When the digital photographing apparatus is turned off, the control unit may associate a current setting information regarding the digital photographing apparatus to the identified user and store the current setting information in the storage unit.

When the digital photographing apparatus is turned off, the control unit may perform a user registration, associate a current setting information regarding the digital photographing apparatus to a registered user, and store the current setting information in the storage unit.

According to one or more embodiments, a method of controlling a digital photographing apparatus is provided, the method includes receiving input of user identification information; identifying a user registered to the digital photographing apparatus based on the received user identification information; confirming setting information regarding the digital photographing apparatus corresponding to the identified user; and applying a setting corresponding to the confirmed setting information to the digital photographing apparatus.

If the confirmed setting information differs from a current setting information regarding the digital photographing apparatus, the applying of the setting may include changing the current setting information to the confirmed setting information.

If the confirmed setting information relates to photographing conditions, the applying of the setting may include applying the photographing conditions in a photographing mode of the digital photographing apparatus.

If the confirmed setting information relates to file storage setting, the applying of the setting may include applying the file storage setting when the digital photographing apparatus stores a file.

The file storage setting may be a setting for automatically setting filenames of files stored in the digital photographing apparatus based on user information of the identified user.

If the user identification information is device information regarding a mobile terminal of a user, the receiving of the input may include receiving the device information from at least one mobile terminal operable to perform wireless communication with the digital photographing apparatus.

If a plurality of device information are received from a plurality of mobile terminals, the recognizing of the user may include displaying user information corresponding to device information regarding identified users from the plurality of received device information, receiving a selection for one of the plurality of displayed user information, and identifying a user registered to the digital photographing apparatus based on the selected user information.

If a plurality of device information are received from a plurality of mobile terminals, the recognizing of the user may include determining reception sensitivities of the respective device information regarding registered users from the plurality of received device information, automatically selecting device information regarding the mobile terminal with the highest reception sensitivity, and identifying a user registered to the digital photographing apparatus based on the automatically selected device information.

If no setting information regarding the digital photographing apparatus is stored in the digital photographing apparatus, the confirming of the setting information may include receiving setting information regarding a mobile terminal from the mobile terminal of a identified user and confirming the received setting information.

The confirming of the setting information may include transmitting at least one parameter constituting the setting information regarding the digital photographing apparatus to the mobile terminal of the identified user, and, in response thereto, receiving setting information regarding the mobile terminal corresponding to the at least one parameter from the mobile terminal.

The receiving of the input may include receiving at least one piece of information selected from the group consisting of a fingerprint of a user and a face image of a user is received.

The method may further include performing a user registration to the digital photographing apparatus. The performing of the user registration may include executing a user registration application installed on the digital photographing apparatus, receiving inputs of user identification information and corresponding user information, and storing the user identification information and the user information as a user profile.

When the digital photographing apparatus is turned off, the method may further include storing a current setting information by associating the current setting information regarding the digital photographing apparatus to the identified user.

When the digital photographing apparatus is turned off, the method may further include storing a current setting information by performing a user registration and associating the current setting information regarding the digital photographing apparatus to a registered user.

According to one or more embodiments, a non-transitory computer readable recording medium is provided and has recorded thereon a computer program executable by a processor for implementing the method of controlling a digital photographing apparatus.

BRIEF DESCRIPTION OF THE DRAWINGS

These and/or other aspects will become apparent and more readily appreciated from the following description of the embodiments, taken in conjunction with the accompanying drawings in which:

FIGS. 11A through 11C are diagrams illustrating operations of a user interface unit during a user registration, according to an embodiment;

DETAILED DESCRIPTION

Figure 1:
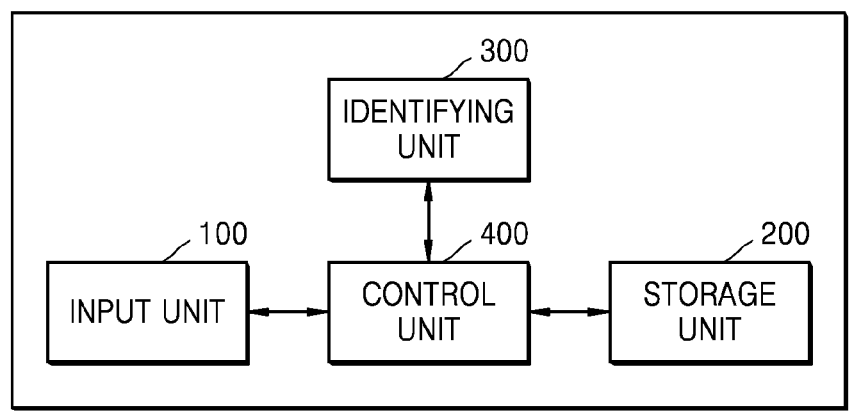
FIG. 1 is a block diagram illustrating the configuration of a digital photographing apparatus, according to an embodiment.

Reference will now be made in detail to embodiments, examples of which are illustrated in the accompanying drawings, wherein like reference numerals refer to like elements throughout.

FIG. 1 is a block diagram illustrating the configuration of an electronic apparatus (e.g., digital photographing apparatus 10), according to an embodiment. Referring to FIG. 1, the digital photographing apparatus 10 may include an input unit 100, a storage unit 200, an identifying unit 300, and a control unit 400. The components may transmit data to and receive data from one another via a data bus. One of ordinary skill in the art will understand and appreciate that general-purpose components other than the components shown in FIG. 1 may be further included.

The input unit 100 may receive input of user identification information. To identify a registered user of the digital photographing apparatus 10, the input unit 100 may receive input of user identification information. The user identification information may be any of various types of information for identifying a user. The input unit 100 may be embodied in various forms based on the type of the user identification information. For example, if the user identification information is a unique number of a mobile terminal of each user, the input unit 100 may be embodied as a communication interface for receiving a unique number from a mobile terminal. Detailed descriptions thereof will be given below.

The storage unit 200 may store all data generated during operation of the digital photographing apparatus 10 or all programs and data used for operating the digital photographing apparatus 10. In other words, the storage unit 200 may store data generated as the digital photographing apparatus 10 operates, such as data received or input from outside or image data, or various programs and data used for controlling the digital photographing apparatus 10.

The storage unit 200 may store setting information regarding the digital photographing apparatus 10 corresponding to respective users registered to the digital photographing apparatus 10. Furthermore, the storage unit 200 may store user identification information for identifying a user and user information. To register a user to the digital photographing apparatus 10, the user may store user identification information and user information as a user profile in the storage unit 200. Furthermore, for a registered user to maintain setting information regarding the digital photographing apparatus 10 after the registered user uses the digital photographing apparatus 10, the setting information regarding the digital photographing apparatus 10 may be stored in the storage unit 200. Here, the setting information regarding the digital photographing apparatus 10 may be information regarding photographing condition setting or file storage setting.

The identifying unit 300 may identify a user registered to the digital photographing apparatus 10 based on user identification information input to the input unit 100. In other words, the identifying unit 300 may compare user identification information input via the input unit 100 to user profiles stored in the storage unit 200. If there is matching user identification information, the identifying unit 300 may identify a user based on the corresponding user identification information. For example, when device information regarding mobile terminals of registered users and user information regarding the registered users are stored in the storage unit 200 and device information regarding a mobile terminal is input via the input unit 100, the identifying unit 300 may identify a user based on user identification information of a registered user including matched device information.

The control unit 400 controls the overall operation of the digital photographing apparatus 10 and may be a microprocessor. Here, the control unit 400 may be divided into a plurality of processor modules that perform respective functions and a main processor module which jointly manages the plurality of processor modules. The control unit 400 may receive data via the input unit 100 or transmit data to an external device. The control unit 400 may store various programs and data in the storage unit 200 or read out various programs and data stored in the storage unit 200. The control unit 400 may perform calculations or data comparisons by using data read out from the storage unit 200.

The control unit 400 may confirm setting information regarding the digital photographing apparatus 10 corresponding to a user identified by the identifying unit 300 and apply the corresponding setting to the digital photographing apparatus 10 based on the confirmed setting information regarding the digital photographing apparatus 10. In other words, if confirmed setting information from the storage unit 200 differs from the current setting information regarding the digital photographing apparatus 10, the control unit 400 may change the current setting information to the confirmed setting information. The setting information regarding the digital photographing apparatus 10 stored in the storage unit 200 may be related to photographing condition setting or file storage setting.

For example, if setting information stored in the storage unit 200 is related to photographing conditions, the control unit 400 may apply the corresponding photographing condition setting as the current photographing condition setting of the digital photographing apparatus 10 in when the digital photographing apparatus 10 is in photographing mode. For another example, if setting information stored in the storage unit 200 is related to file storage setting, the control unit 400 may apply the corresponding file storage setting as the current file storage setting of the digital photographing apparatus 10 when the digital photographing apparatus 10 stores a file. Here, the file storage setting may be a setting for automatically setting filenames of files stored in the digital photographing apparatus 10 based on user information of a registered user. Since user information regarding a registered user is known, filenames of files stored in the digital photographing apparatus 10 may be automatically named based on the user information of the registered user.

Figure 2A:
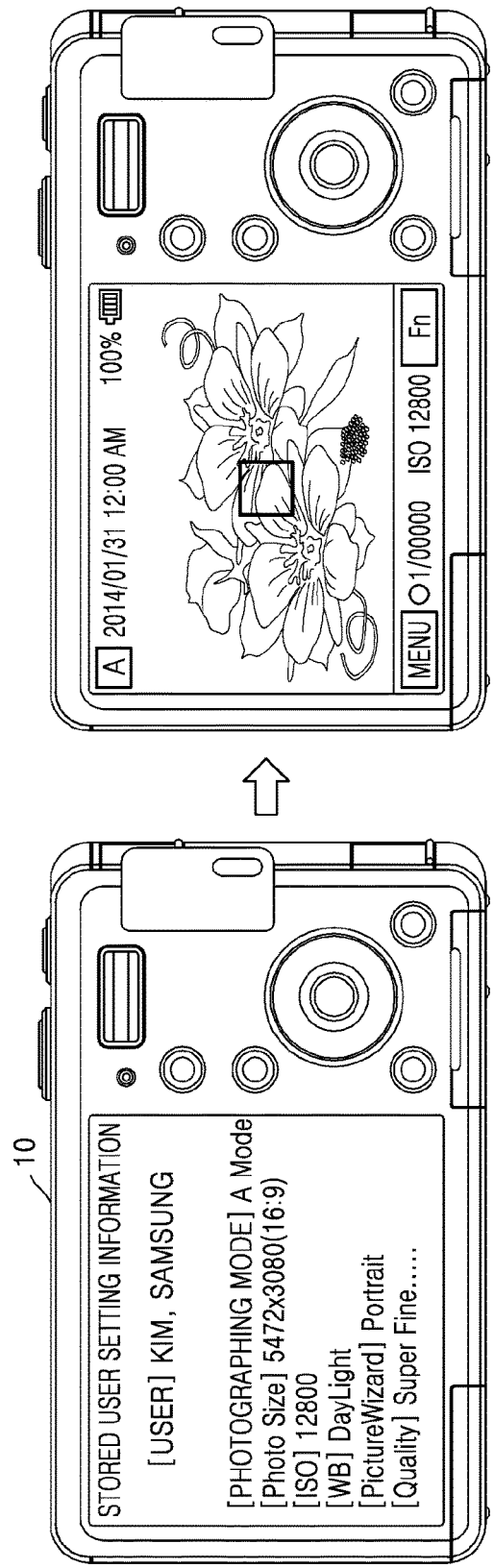
FIGS. 2A and 2B are diagrams illustrating an example in which settings are applied to a digital photographing apparatus based on setting information regarding the digital photographing apparatus corresponding to registered users.
Figure 2B:
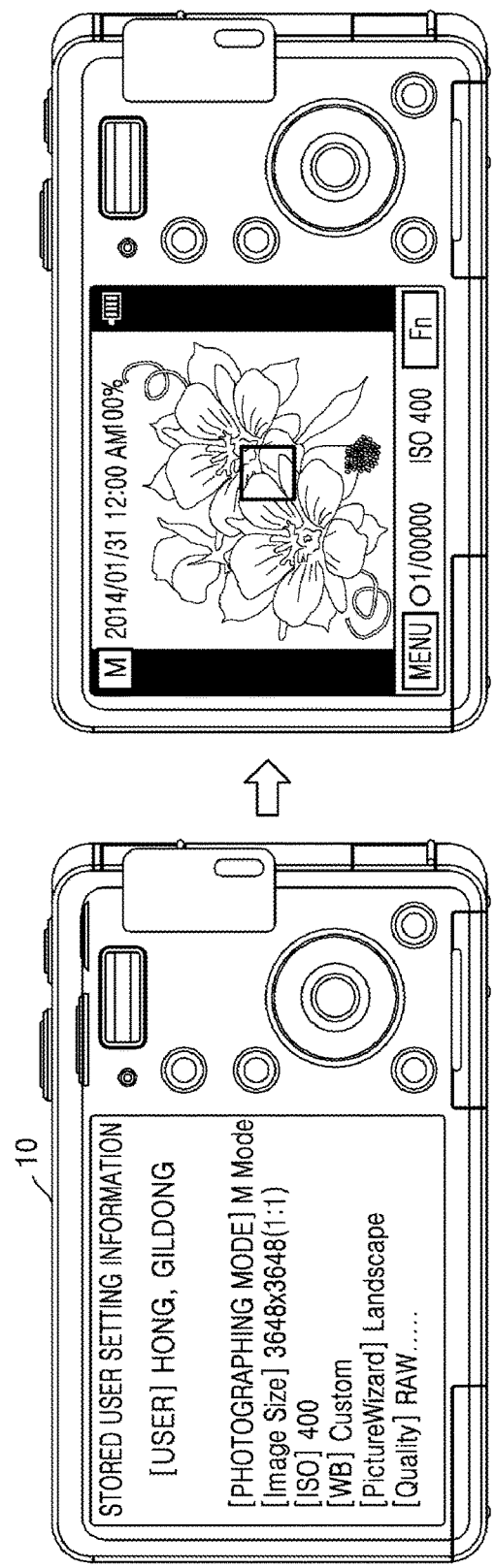

FIGS. 2A and 2B are diagrams illustrating an example in which settings are applied to a digital photographing apparatus based on setting information regarding the digital photographing apparatus corresponding to registered users, according to an embodiment. In detail, FIGS. 2A and 2B show photographing condition setting information set by two different users and application of the settings to the digital photographing apparatus 10 based on the photographing condition setting information.

FIG. 2A shows photographing condition setting of a user named "KIM, Samsung" registered to the digital photographing apparatus 10 and application of the photographing condition setting to the digital photographing apparatus 10 in a photographing mode of the digital photographing apparatus 10. In detail, the photographing condition setting of the user named "KIM, Samsung" indicates that photographing mode is "A Mode" (Auto Mode), image size ("[Photo Size]") is "5472×3080," image aspect ratio is "16:9," ISO is "12800," white balance is "Day Light," image effect ("[Picture Wizard]") is "Portrait," and image quality is "Fine." The right portion of FIG. 2A shows a screen image reflecting the application of the photographing condition setting.

Meanwhile, FIG. 2B shows photographing condition setting of a user named "HONG, Gildong" registered to the digital photographing apparatus 10 and application of the photographing condition setting to the digital photographing apparatus 10 in a photographing mode of the digital photographing apparatus 10. In detail, the photographing condition setting of the user named "HONG, Gildong" indicates that photographing mode is "M Mode" (Manual Mode), image size is "3648×3648," image aspect ratio is "1:1," ISO is "400," white balance is "Custom," image effect ("[Picture Wizard]") is "Landscape," and image quality is "RAW." The right portion of FIG. 2B shows a screen image reflecting the application photographing condition setting.

As shown in FIGS. 2A and 2B, users may prefer different settings for the digital photographing apparatus 10, where it may be very inconvenient to change settings of the digital photographing apparatus 10 every time a user is changed. Particularly, if a user is not an expert in operating the digital photographing apparatus 10, it may be difficult to change complicated setting of the digital photographing apparatus 10 set by an expert to a desired setting.

Therefore, since the digital photographing apparatus 10 according to the embodiment shown in FIG. 1 identifies a current user of the digital photographing apparatus 10 and automatically applies a setting of the digital photographing apparatus 10 corresponding to the identified user, it is not necessary for a user to remember information regarding setting of the digital photographing apparatus 10 or manually set the digital photographing apparatus 10 to a desired setting.

Figure 3:
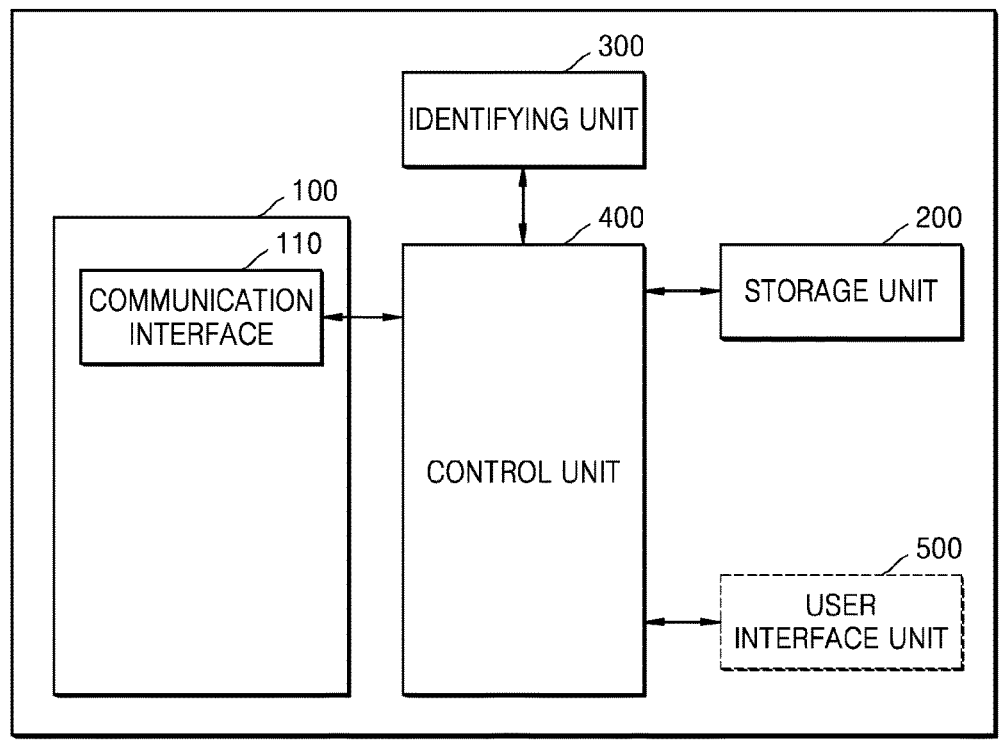
FIG. 3 is a block diagram illustrating the configuration of a digital photographing apparatus, according to another embodiment.

FIG. 3 is a block diagram illustrating the configuration of the digital photographing apparatus 10, according to another embodiment. Referring to FIG. 3, the digital photographing apparatus 10 may include the input unit 100, the storage unit 200, the identifying unit 300, and the control unit 400. Particularly, the input unit 100 may include a communication interface 110. Descriptions already given above will be omitted below. One of ordinary skill in the art will understand and appreciate that general-purpose components other than the components shown in FIG. 3 may be further included.

If the input unit 100 is the communication interface 110 or includes the communication interface 110, the digital photographing apparatus 10 may communicates with an external device and transmit/receive data. For example, the digital photographing apparatus 10 may request user identification information from a mobile terminal capable of performing wireless communication and, in response thereto, the digital photographing apparatus 10 may receive device information regarding a corresponding mobile terminal from at least one mobile terminal capable of performing wireless communication. Here, the device information regarding the mobile terminal is unique information for identifying a user and may include a serial number of the mobile terminal and, if the mobile terminal is a mobile phone, a mobile phone number.

The communication interface 110 may be any of various communication modules capable of supporting communication between the digital photographing apparatus 10 and an external device. For example, the communication interface 110 may support close-distance communication protocols, such as Wi-Fi direct, Bluetooth, Zigbee, near field communication (NFC), etc. However, the invention is not limited thereto.

Figure 4:
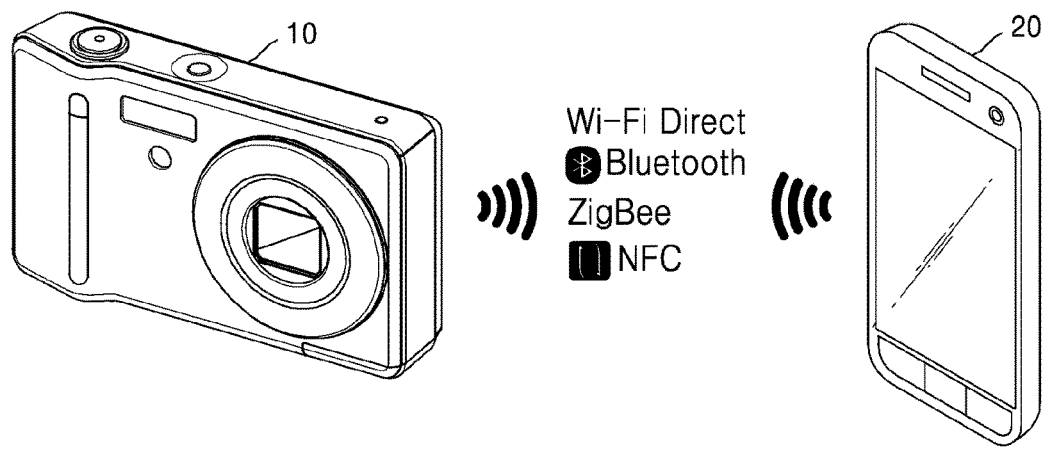
FIG. 4 is a diagram illustrating a process of a digital photographing apparatus communicating with at least one mobile terminal capable of performing wireless communication, according to an embodiment.

FIG. 4 is a diagram showing a process of the digital photographing apparatus 10 communicating with at least one mobile terminal capable of performing wireless communication, according to an embodiment.

Referring to FIG. 4, the digital photographing apparatus 10 may exchange data with a mobile terminal 20 via a close-distance communication protocol, such as Wi-Fi direct, Bluetooth, Zigbee, and NFC. For example, if the digital photographing apparatus 10 sends a message for requesting device information within a designated range around the digital photographing apparatus 10 to receive device information regarding the mobile terminals 20, the digital photographing apparatus 10 may receive device information from the mobile terminal 20 in response thereto.

Referring back to FIG. 3, since the device information regarding the mobile terminal 20 may be user identification information for identifying a user, the digital photographing apparatus 10 may identify a user registered to the digital photographing apparatus 10 based on device information received via the communication interface 110. In other words, if device information regarding mobile terminals of users registered to the digital photographing apparatus 10 as user profiles, the identifying unit 300 may identify a user registered to the digital photographing apparatus 10 based on device information regarding a mobile terminal that is received by the communication interface 110. When a user is identified, the control unit 400 may confirm setting information regarding the digital photographing apparatus 10 corresponding to the registered user and apply a setting corresponding to the confirmed setting information to the digital photographing apparatus 10.

If no setting information regarding the digital photographing apparatus 10 is stored in the storage unit 200, the control unit 400 may obtain setting information regarding the digital photographing apparatus 10 from outside. For example, the control unit 400 may receive setting information regarding the mobile terminal 20 from the mobile terminal 20 of an identified user and confirm the received setting information regarding the mobile terminal 20 as setting information regarding the digital photographing apparatus 10. Here, the control unit 400 transmits at least one parameter constituting the setting information regarding the digital photographing apparatus 10 to the mobile terminal 20 of the registered user and, in response thereto, receives setting information regarding the mobile terminal 20 corresponding to the at least one parameter from the mobile terminal 20 of the registered user, thereby confirming the setting information regarding the mobile terminal 20 as the setting information regarding the digital photographing apparatus 10.

Therefore, it is not necessary for a user to manually set the digital photographing apparatus 10 and the digital photographing apparatus 10 may be automatically set in correspondence to a current user.

If the communication interface 110 receives a plurality of device information from a plurality of mobile terminals, it may be necessary to identify a current user from among a plurality of users registered to the digital photographing apparatus 10. To this end, the digital photographing apparatus 10 may further include a user interface unit 500. The user interface unit 500 may display information to a user and obtain input signals from the user. The user interface unit 500 may include any input/output devices arranged at the digital photographing apparatus 10, such as an electrostatic or piezoelectric touch screen, a display panel, and a touch pad. The user interface unit 500 may receive various inputs for controlling the digital photographing apparatus 10 from a user.

For example, if the communication interface 110 receives a plurality of device information from the plurality of mobile terminals 20, the user interface unit 500 may display user information corresponding to device information regarding registered users from among the received device information. The user interface unit 500 may receive a user selection from a current user for one of the plurality of displayed user information. The identifying unit 300 may identify a user registered to the digital photographing apparatus 10 based on the selected user information. Detailed descriptions thereof will be given below with reference to FIG. 5.

Figure 5:
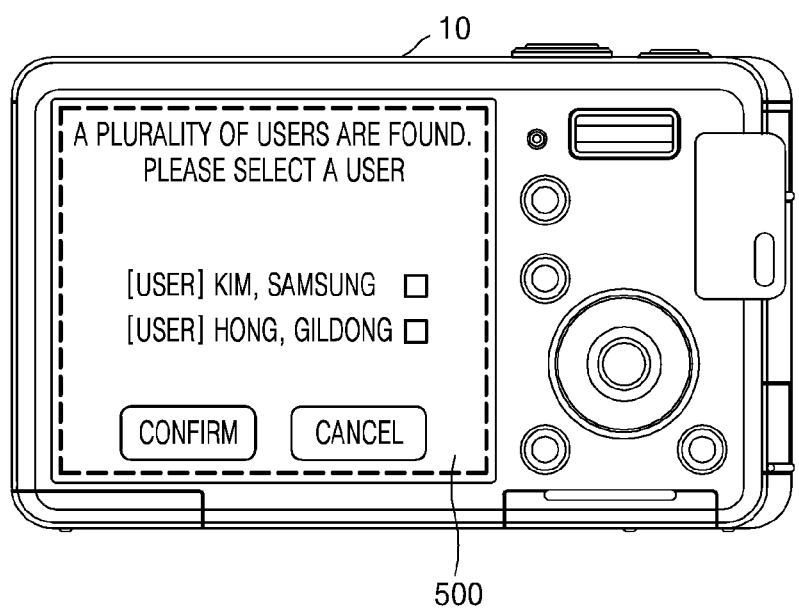
FIG. 5 is a diagram illustrating a user interface in a case where a digital photographing apparatus receives a plurality of device information from a plurality of mobile terminals, according to an embodiment.

FIG. 5 is a diagram illustrating a user interface in a case where the digital photographing apparatus 10 receives a plurality of device information from a plurality of mobile terminals, according to an embodiment.

Referring to FIG. 5, a message requesting the selection of a user from among a plurality of registered users that are found and a list of users corresponding to received device information from among registered users are displayed on the user interface unit 500 of the digital photographing apparatus 10. Checkboxes are displayed to the right of the list, so that a user may be selected. However, it is merely an example, and the invention is not limited thereto.

For another example, referring back to FIG. 3, if the communication interface 110 receives a plurality of device information from the plurality of mobile terminals 20, the control unit 400 may determine reception sensitivities of the respective device information regarding registered users and may automatically select device information regarding the mobile terminal 20 with the highest reception sensitivity. The identifying unit 300 may identify a user registered to the digital photographing apparatus 10 based on the device information automatically selected by the control unit 400.

Figure 6:
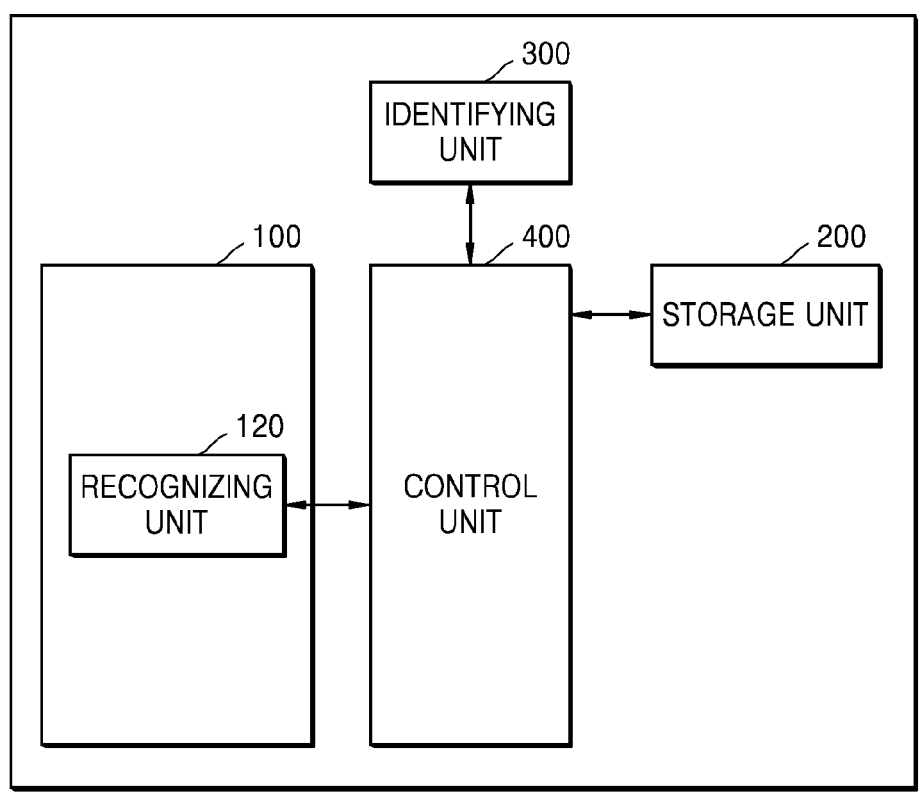
FIG. 6 is a block diagram illustrating the configuration of a digital photographing apparatus, according to another embodiment.

FIG. 6 is a block diagram illustrating the configuration of the digital photographing apparatus 10, according to another embodiment. Referring to FIG. 6, the digital photographing apparatus 10 may include the input unit 100, the storage unit 200, the identifying unit 300, and the control unit 400. Particularly, the input unit 100 may include a recognizing unit 120. Descriptions already given above will be omitted below. One of ordinary skill in the art will understand and appreciate that general-purpose components other than the components shown in FIG. 6 may be further included.

If the input unit 100 is the recognizing unit 120 or includes the recognizing unit 120, the digital photographing apparatus 10 may directly receive information for identifying a user via the recognizing unit 120. For example, if the recognizing unit 120 is capable of recognizing a fingerprint of a user, the recognized user fingerprint may be used as user identification information. If the recognizing unit 120 recognizes a fingerprint of a user, the recognizing unit 120 may be attached to an arbitrary button, e.g., a power button, of the digital photographing apparatus 10 for recognizing the fingerprint of a user.

However, the invention is not limited thereto. The recognizing unit 120 may be any of various devices for identifying a user by scanning a user's body part or by determining unique bio-signals of a user. For convenience of explanation, description will be given regarding a case where the recognizing unit 120 recognizes fingerprint.

Fingerprint of a user recognized by the recognizing unit 120 may be user identification information for identifying the user, and thus the digital photographing apparatus 10 may identify a user registered to the digital photographing apparatus 10 based on the fingerprint input via the recognizing unit 120. In other words, if fingerprints of users registered to the digital photographing apparatus 10 are stored as user profiles in the storage unit 200, the identifying unit 300 may identify a user registered to the digital photographing apparatus 10 based on a fingerprint input via the recognizing unit 120. When a user is indentified, the control unit 400 may confirm setting information regarding the digital photographing apparatus 10 corresponding to the identified user and apply a setting corresponding to the confirmed setting information. Therefore, it is not necessary for a user to manually set the digital photographing apparatus 10 and the digital photographing apparatus 10 may be automatically set in correspondence to a current user.

Figure 7:
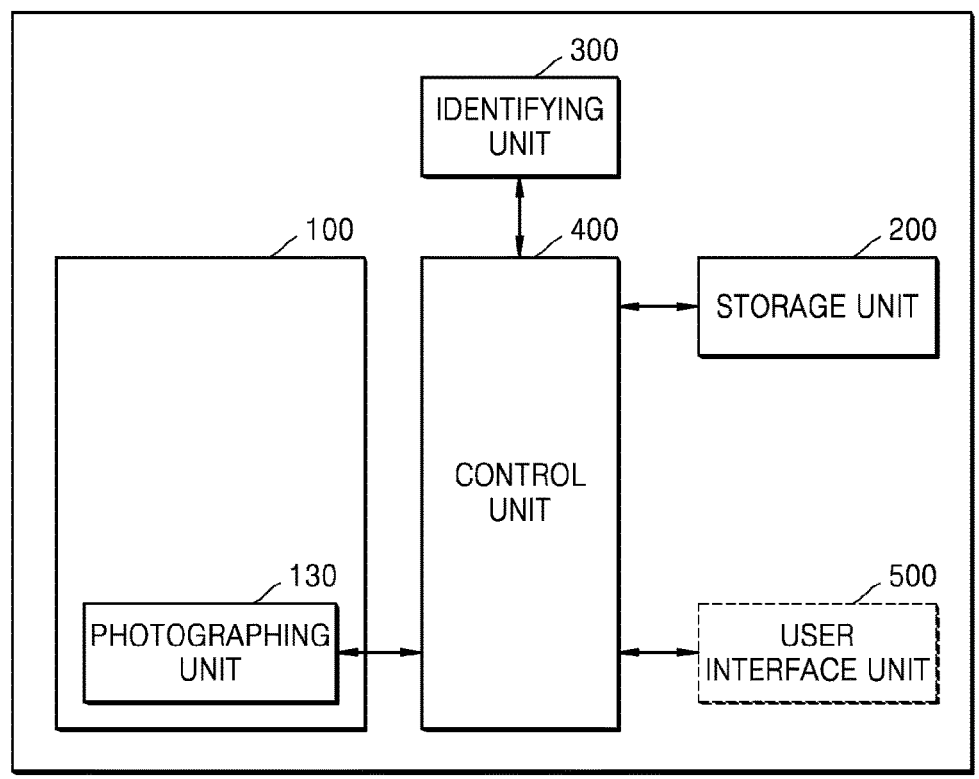
FIG. 7 is a block diagram illustrating the configuration of a digital photographing apparatus, according to another embodiment.

FIG. 7 is a block diagram illustrating the configuration of the digital photographing apparatus 10, according to another embodiment. Referring to FIG. 7, the digital photographing apparatus 10 may include the input unit 100, the storage unit 200, the identifying unit 300, and the control unit 400. Particularly, the input unit 100 may include a photographing unit 130. Descriptions already given above will be omitted below. One of ordinary skill in the art will understand and appreciate that general-purpose components other than the components shown in FIG. 7 may be further included.

If the input unit 100 is the photographing unit 130 or includes the photographing unit 130, the digital photographing apparatus 10 may receive information for identifying a user via the photographing unit 130. For example, if the photographing unit 130 (e.g., an image sensor) may photograph a face of a user, a photographed user face image may be used as user identification information.

Face of a user photographed by the photographing unit 130 may be user identification information for identifying the user, and thus the digital photographing apparatus 10 may identify a user registered to the digital photographing apparatus 10 based on a face image photographed by the photographing unit 130. In other words, if face images of users registered to the digital photographing apparatus 10 are stored as user profiles in the storage unit 200, the identifying unit 300 may identify a user registered to the digital photographing apparatus 10 based on a face image photographed by the photographing unit 130. When a user is identified, the control unit 400 may confirm setting information regarding the digital photographing apparatus 10 corresponding to the identified user and apply a setting corresponding to the confirmed setting information. Therefore, it is not necessary for a user to manually set the digital photographing apparatus 10 and the digital photographing apparatus 10 may be automatically set in correspondence to a current user.

If the photographing unit 130 photographs a plurality of faces, it may be necessary to identify a current user from among a plurality of users registered to the digital photographing apparatus 10. To this end, the digital photographing apparatus 10 may further include the user interface unit 500. The user interface unit 500 may display an image in which a plurality of faces are photographed and obtain a user selection for one of the plurality of faces, thereby identifying a user.

Figure 8:
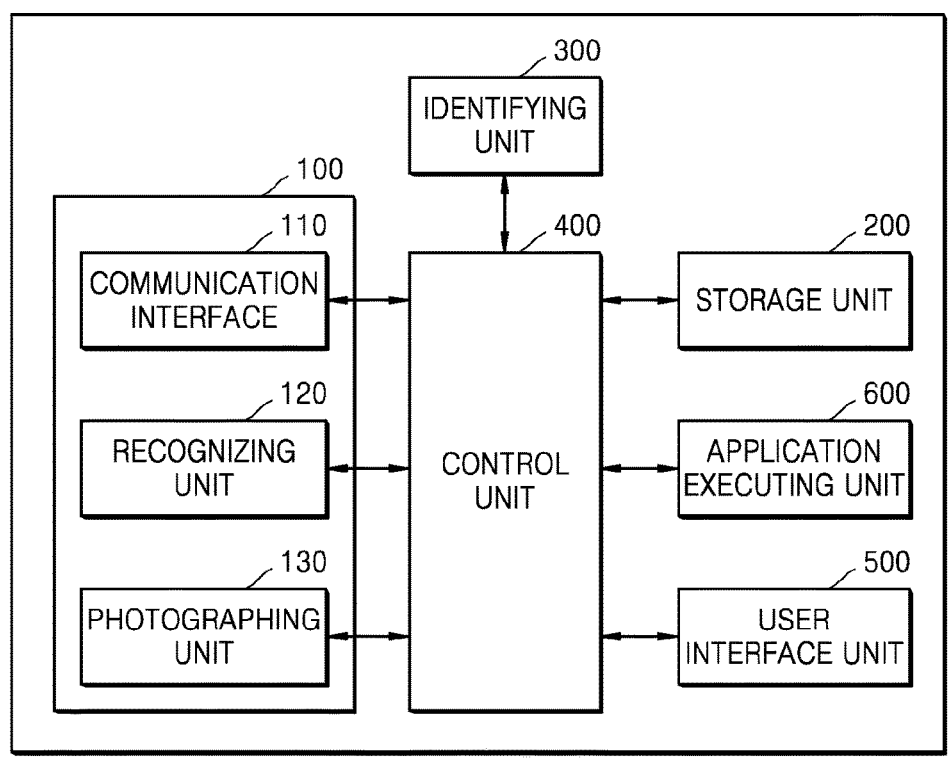
FIG. 8 is a block diagram illustrating the configuration of a digital photographing apparatus, according to another embodiment.

FIG. 8 is a block diagram illustrating the configuration of the digital photographing apparatus 10, according to another embodiment. Referring to FIG. 8, the digital photographing apparatus 10 may include the input unit 100, the storage unit 200, the identifying unit 300, the control unit 400, the user interface unit 500, and an application executing unit 600. The components may transmit data to and receive data from one another via a data bus. Descriptions already given above will be omitted below. One of ordinary skill in the art will understand and appreciate that general-purpose components other than the components shown in FIG. 8 may be further included.

As shown in FIG. 8, the input unit 100 may include all of the communication interface 110, the recognizing unit 120, and the photographing unit 130. Alternatively, unlike the input unit 100 shown in FIG. 8, the input unit 100 may include at least one of the communication interface 110, the recognizing unit 120, and the photographing unit 130.

For the digital photographing apparatus 10 to identify a user based on user identification information input via the input unit 100, it is necessary to register users to the digital photographing apparatus 10. In other words, to identify a user based on user identification information, it is necessary for the digital photographing apparatus 10 to store user identification information and user information in advance. Furthermore, to confirm setting information regarding the digital photographing apparatus 10 corresponding to a registered user and to apply a setting corresponding to the confirmed setting information, it is necessary for the digital photographing apparatus 10 to store setting information regarding the digital photographing apparatus 10 corresponding to a registered user in advance. Detailed descriptions thereof will be given below.

First, registration of a user to the digital photographing apparatus 10 will be described below. The application executing unit 600 may execute a user registration application installed on the digital photographing apparatus 10. Such a user registration application may be executed when the digital photographing apparatus 10 is turned on or when a user executes the user registration application by using the user interface unit 500 while the user is using the digital photographing apparatus 10. When the user registration application is executed, the user interface unit 500 may receive user information corresponding to user identification information input via the input unit 100. Here, the user identification information may be input by using at least one of the communication interface 110, the recognizing unit 120, and the photographing unit 130. In other words, at least one piece of identifying information from device information regarding a mobile terminal, a user fingerprint, and a face image of a user may be received as user identification information and user information corresponding thereto may be received via the user interface unit 500. The control unit 400 may store the user identification information and the user information as a user profile in the storage unit 200, thereby registering a user to the digital photographing apparatus 10.

Meanwhile, an operation for storing a current setting information regarding the digital photographing apparatus 10 will be described below. When the digital photographing apparatus 10 is turned off, the control unit 400 may associate the current setting information regarding the digital photographing apparatus 10 to the currently identified user and store the current setting information in the storage unit 200.

If there is no currently identified user and no user is registered to the digital photographing apparatus 10, the control unit 400 may perform a user registration, associate the current setting information regarding the digital photographing apparatus 10 to the currently registered user, and store the current setting information in the storage unit 200, when the digital photographing apparatus 10 is turned off.

Figure 9:
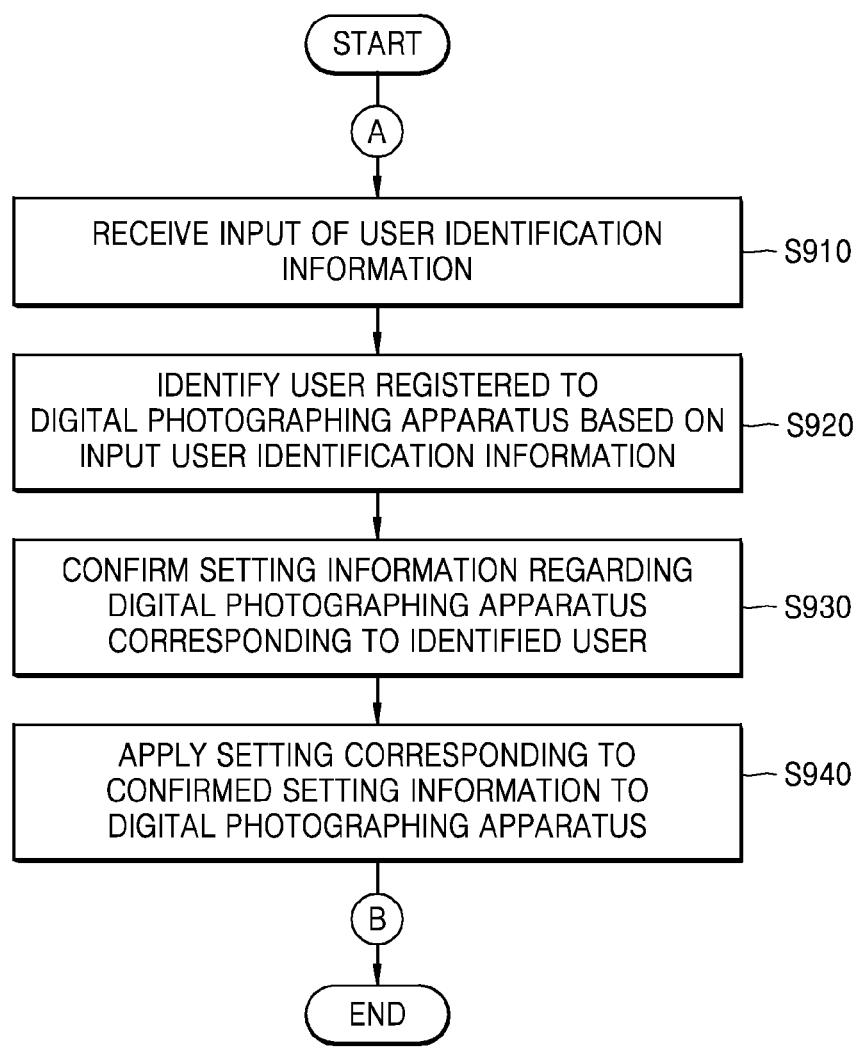
FIG. 9 is a flowchart illustrating a method of controlling a digital photographing apparatus, according to an embodiment.

FIG. 9 is a flowchart illustrating a method of controlling the digital photographing apparatus 10, according to an embodiment. Any description regarding the digital photographing apparatus 10 described above may also be applied to the method of controlling the digital photographing apparatus 10.

First, in an operation S910, the digital photographing apparatus 10 may receive user identification information. The digital photographing apparatus 10 may receive various types of user identification information. For example, if the user identification information is device information regarding a mobile terminal of a user, the digital photographing apparatus 10 may receive device information from at least one mobile terminal 20 capable of performing wireless communication with the digital photographing apparatus 10. For another example, the digital photographing apparatus 10 may receive at least one piece of information selected from the group consisting of a user fingerprint and a face image of a user.

In an operation S920, the digital photographing apparatus 10 may identify a user registered to the digital photographing apparatus 10 based on the input user identification information.

For example, if a plurality of device information are received from the plurality of mobile terminals 20, user information corresponding to device information regarding registered users from among the plurality of received device information may be displayed, a user selection for one of the plurality of displayed user information may be received, and a user registered to the digital photographing apparatus 10 may be identified based on the selected user information.

For another example, If a plurality of device information are received from the plurality of mobile terminals 20, reception sensitivities of the respective device information regarding registered users may be determined, device information regarding the mobile terminal 20 with the highest reception sensitivity may be automatically selected, and a user registered to the digital photographing apparatus 10 may be identified based on the device information automatically selected by the control unit 400.

In an operation S930, the digital photographing apparatus 10 may confirm setting information regarding the digital photographing apparatus 10 corresponding to an identified user. Here, the setting information regarding the digital photographing apparatus 10 may be information regarding photographing condition setting or file storage setting. The setting information regarding the digital photographing apparatus 10 may be stored in the storage unit 200. The digital photographing apparatus 10 may store the setting information regarding the digital photographing apparatus 10 in the storage unit 200 in correspondence to user information and/or user identification information, and thus the digital photographing apparatus 10 may confirm setting information regarding the digital photographing apparatus 10 corresponding to identified user based on user information and/or user identification information of the identified user.

If no setting information regarding the digital photographing apparatus 10 is stored in the storage unit 200, the digital photographing apparatus 10 may obtain setting information regarding the digital photographing apparatus 10 from outside. For example, the digital photographing apparatus 10 may receive setting information regarding the mobile terminal 20 from the mobile terminal 20 of an identified user via the communication interface 110 and confirm the received setting information regarding the mobile terminal 20 as setting information regarding the digital photographing apparatus 10. Here, the digital photographing apparatus 10 may transmit at least one parameter constituting the setting information regarding the digital photographing apparatus 10 to the mobile terminal 20 of the registered user and, in response thereto, receive setting information regarding the mobile terminal 20 corresponding to the at least one parameter from the mobile terminal 20 of the registered user, thereby confirming the setting information regarding the mobile terminal 20 as the setting information regarding the digital photographing apparatus 10.

In an operation S940, a setting may be applied to the digital photographing apparatus 10 based on the confirmed setting information. If the confirmed setting information differs from the current setting information regarding the digital photographing apparatus 10, the digital photographing apparatus 10 may change the current setting information to the confirmed setting information. If setting information stored in the storage unit 200 is related to photographing conditions, the digital photographing apparatus 10 may apply the corresponding photographing condition setting when the digital photographing apparatus 10 is in photographing mode. Alternatively, if the confirmed setting information is related to file storage setting, the digital photographing apparatus 10 may apply the corresponding file storage setting as the current file storage setting of the digital photographing apparatus 10 when the digital photographing apparatus 10 stores a file.

Figure 10:
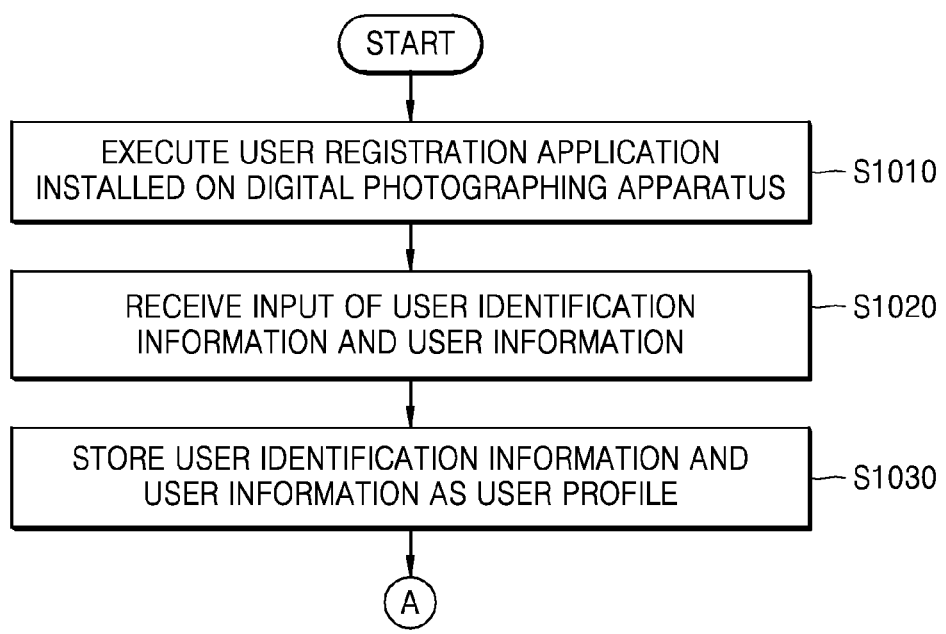
FIG. 10 is a flowchart illustrating user registration for controlling a digital photographing apparatus, according to an embodiment.
Figure 11A:
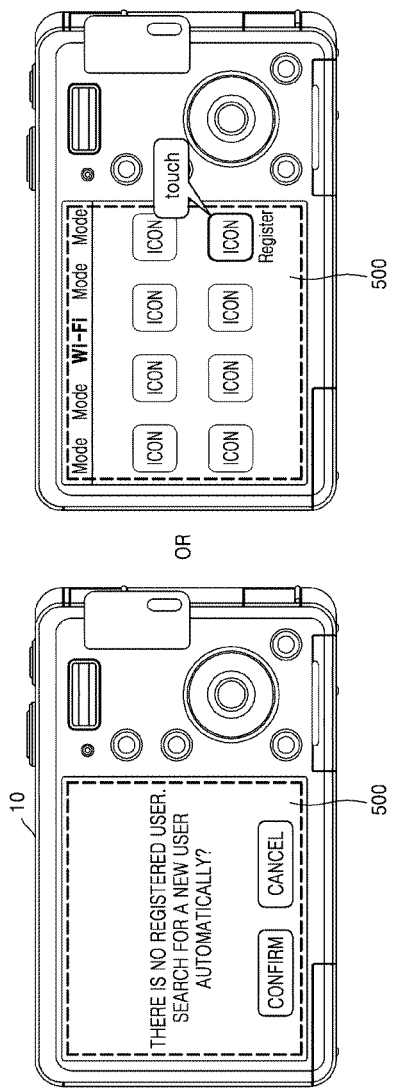
Figure 11C:
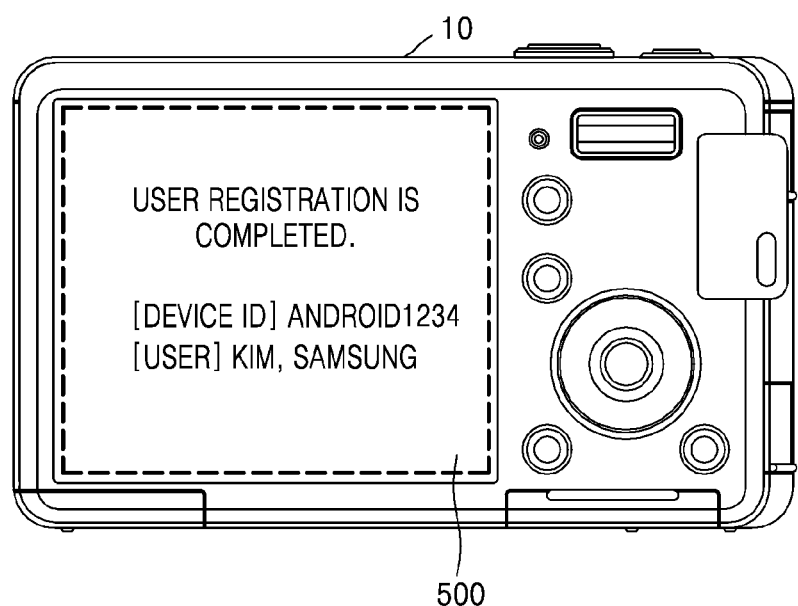

FIG. 10 is a flowchart illustrating user registration for controlling the digital photographing apparatus 10, according to an embodiment. FIGS. 11A through 11C are diagrams illustrating operations of the user interface unit 500 during a user registration, according to an embodiment.

In an operation S1010, the digital photographing apparatus 10 may execute a user registration application installed on the digital photographing apparatus 10. The user registration application may be executed when the digital photographing apparatus 10 is turned on or when the user registration application is executed by a user. FIG. 11A shows the user interface unit 500 of the digital photographing apparatus 10 when the user registration application is executed. The left portion of FIG. 11A shows that the user registration application is executed when the digital photographing apparatus 10 is turned on, whereas the right portion of FIG. 11A shows that the user registration application displayed on the user interface unit 500 is executed by a user's touch.

In an operation S1020, the digital photographing apparatus 10 may receive user identification information and user information of a user. The left portion of FIG. 11B shows that device information regarding the mobile terminal 20 is input via the communication interface 110. The right portion of FIG. 11B show that user information is being input via the user interface unit 500 after the device information regarding the mobile terminal 20 is input.

In an operation S1030, user identification information and user information of a user of the digital photographing apparatus 10 may be stored as a user profile. FIG. 11C shows that the user interface unit 500 displays user identification information and user information stored as a user profile in the digital photographing apparatus 10 after user registration is completed.

Figure 12:
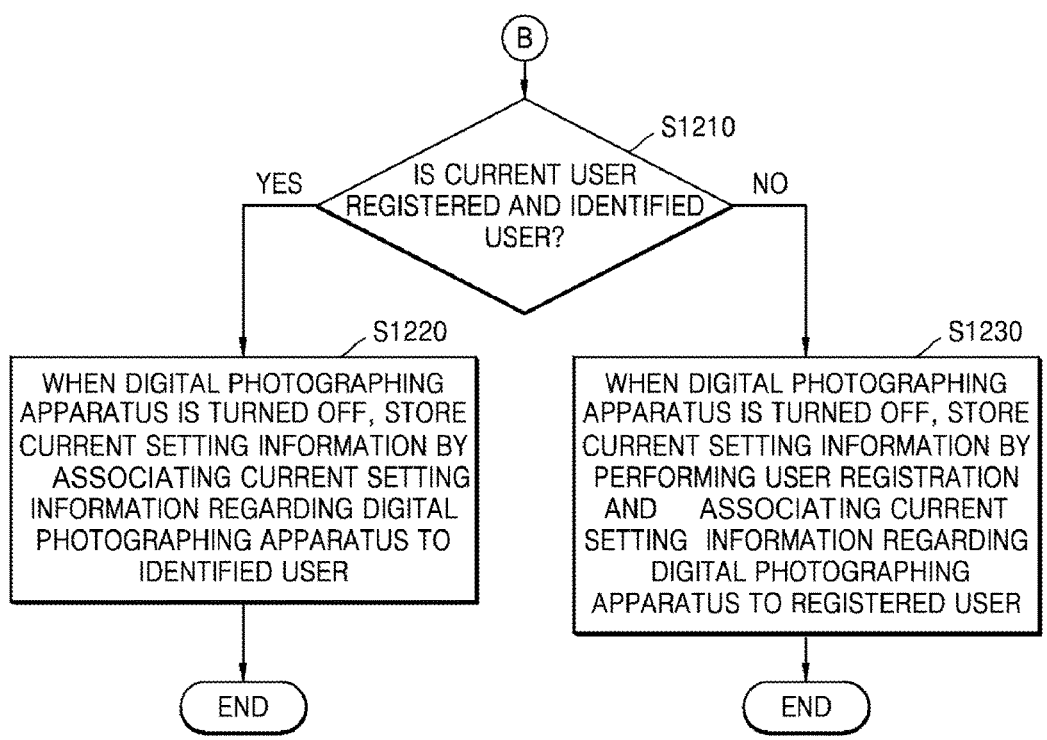
FIG. 12 is a flowchart illustrating a method of storing a current setting information for controlling a digital photographing apparatus, according to an embodiment.

FIG. 12 is a flowchart illustrating a method of storing a current setting information for controlling the digital photographing apparatus 10, according to an embodiment.

In an operation S1210, when the digital photographing apparatus 10 is turned off, it may be determined whether a current user is a registered and identified user.

If the current user is a registered and identified user (YES after operation S1210), the current setting information regarding the digital photographing apparatus 10 may be stored in correspondence to the identified user and stored when the digital photographing apparatus 10 is turned off, in an operation S1220.

If the current user is neither a registered user nor an identified user, when the digital photographing apparatus 10 is turned off, a user registration may be performed, the current setting information regarding the digital photographing apparatus 10 may be stored in correspondence to the identified user and stored, in an operation S1230.

Figure 13:
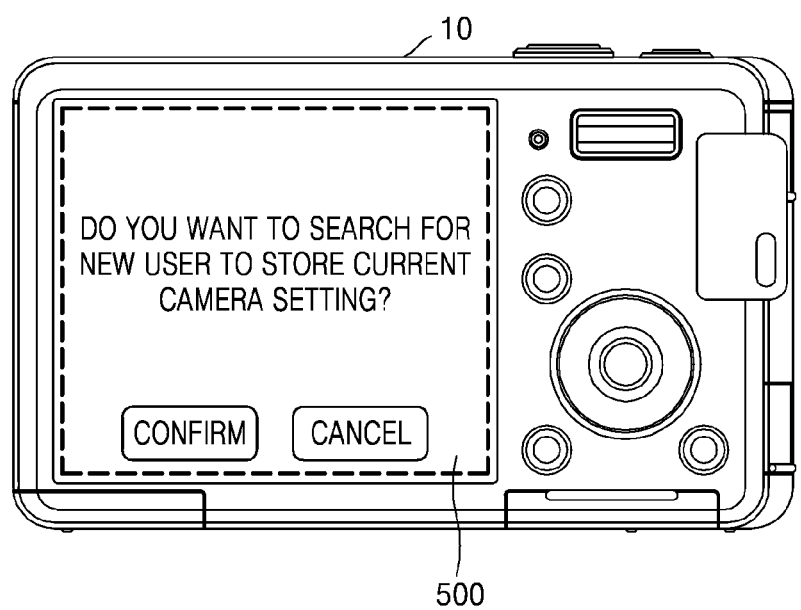
FIG. 13 is a diagram illustrating operation of a user interface unit when the current setting information regarding the digital photographing apparatus is stored, according to an embodiment.

FIG. 13 is a diagram illustrating operation of the user interface unit 500 when the current setting information regarding the digital photographing apparatus 10 is stored, according to an embodiment. In detail, FIG. 13 shows a screen image displayed on the user interface unit 500 when the operation S1230 shown in FIG. 12 is initiated.

If a current user is neither a registered user nor an identified user, a screen image inquiring whether to search for and register a new user is displayed. And, if the current user requests user registration, a user registration as described above with reference to FIGS. 10 through 11C may be performed and the current setting information regarding the digital photographing apparatus 10 may be stored in correspondence to the identified user and stored.

As described above, according to the one or more of the above embodiments, when a plurality of users share a single digital photographing apparatus, a current user of the digital photographing apparatus is identified and a setting of the digital photographing apparatus corresponding to the identified user is automatically applied. Therefore, user inconveniences such as having to remember setting information regarding a digital photographing apparatus or having to manually setting the digital photographing apparatus may be resolved.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

While one or more embodiments of the invention have been described with reference to the figures, it will be understood by those of ordinary skill in the art that various changes in form and details may be made therein without departing from the spirit and scope of the invention as defined by the following claims.

What is claimed is:

1. A digital photographing apparatus comprising:
    an input unit that receives user identification information, the input unit comprising a communication interface that receives device information regarding a mobile terminal from at least one mobile terminal operable to perform wireless communication with the digital photographing apparatus;
    an identifying unit that identifies a user registered to the digital photographing apparatus based on received user identification information, wherein the identifying unit identifies the user registered to the digital photographing apparatus based on the received device information;
    a storage unit that stores setting information regarding the digital photographing apparatus corresponding to the user registered to the digital photographing apparatus; and
    a control unit that confirms setting information regarding the digital photographing apparatus corresponding to the identified user and applies a setting corresponding to the confirmed setting information to the digital photographing apparatus;
    wherein, if no setting information regarding the digital photographing apparatus is stored in the storage unit, the control unit transmits at least one parameter constituting the setting information regarding the digital photographing apparatus to a mobile terminal of the registered user; and
    in response thereto, the control unit receives setting information regarding the mobile terminal of the registered user corresponding to the at least one parameter from the mobile terminal of the registered user and applies a setting corresponding to the received setting information to the digital photographing apparatus.

2. The digital photographing apparatus of claim 1, wherein, if the confirmed setting information differs from a current setting information regarding the digital photographing apparatus, the control unit changes the current setting information to the confirmed setting information.

3. The digital photographing apparatus of claim 1, wherein, if the confirmed setting information relates to photographing conditions, the control unit applies the photographing conditions when the digital photographing apparatus is in a photographing mode.

4. The digital photographing apparatus of claim 1, wherein, if the confirmed setting information relates to file storage setting, the control unit applies the file storage setting when the digital photographing apparatus stores a file.

5. The digital photographing apparatus of claim 4, wherein the file storage setting is a setting for automatically setting filenames of files stored in the digital photographing apparatus based on user information of the identified user.

6. The digital photographing apparatus of claim 1, further comprising a user interface unit, which, if the communication interface receives a plurality of device information from a plurality of mobile terminals, displays user information corresponding to device information regarding identified users from the plurality of received device information and receives a selection for one of the plurality of displayed user information, and
the identifying unit identifies the user registered to the digital photographing apparatus based on the selected user information.

7. The digital photographing apparatus of claim 1, wherein, if the communication interface receives a plurality of device information from a plurality of mobile terminals, the control unit determines reception sensitivities of the respective device information regarding registered users from the plurality of received device information and automatically selects device information regarding the mobile terminal with the highest reception sensitivity, and
the identifying unit identifies the user registered to the digital photographing apparatus based on the device information automatically selected by the control unit.

8. The digital photographing apparatus of claim 1, wherein:
the input unit comprises at least one unit selected from the group consisting of a recognizing unit that receives input of a fingerprint of the user and a photographing unit that receives input of a face image of the user, and
the identifying unit identifies the user registered to the digital photographing apparatus based on at least one piece of information selected from the group consisting of the fingerprint of the user and the face image of the user.

9. The digital photographing apparatus of claim 1, further comprising:
an application executing unit that executes an user registration application installed on the digital photographing apparatus; and
a user interface unit that receives user information corresponding to user identification information input via the input unit when the user registration application is executed,
wherein the control unit stores the user identification information and the user information in the storage unit as a user profile.

10. The digital photographing apparatus of claim 1, wherein, when the digital photographing apparatus is turned off, the control unit associates a current setting information regarding the digital photographing apparatus to the identified user and stores the current setting information in the storage unit.

11. The digital photographing apparatus of claim 1, wherein, when the digital photographing apparatus is turned off, the control unit performs a user registration, associates a current setting information regarding the digital photographing apparatus to a registered user, and stores the current setting information in the storage unit.

12. A method of controlling a digital photographing apparatus, the method comprising:
receiving input of user identification information;
identifying a user registered to the digital photographing apparatus based on the received user identification information;
confirming setting information regarding the digital photographing apparatus corresponding to the identified user; and
applying a setting corresponding to the confirmed setting information to the digital photographing apparatus,
wherein, if the user identification information is device information regarding a mobile terminal of a user, the receiving of the input comprises receiving the device information from at least one mobile terminal operable to perform wireless communication with the digital photographing apparatus,
wherein, if no setting information regarding the digital photographing apparatus is stored in the digital photographing apparatus, the confirming of the setting information comprises transmitting at least one parameter constituting the setting information regarding the digital photographing apparatus to the mobile terminal of the identified user, and
in response thereto, receiving setting information regarding the mobile terminal of the identified user corresponding to the at least one parameter from the mobile terminal of the identified user and confirming the received setting information.

13. The method of claim 12, wherein, if the confirmed setting information differs from a current setting information regarding the digital photographing apparatus, the applying of the setting comprises changing the current setting information to the confirmed setting information.

14. The method of claim 12, wherein, if the confirmed setting information relates to photographing conditions, the applying of the setting comprises applying the photographing conditions when the digital photographing apparatus is in a photographing mode.

15. The method of claim 12, wherein, if the confirmed setting information relates to file storage setting, the applying of the setting comprises applying the file storage setting when the digital photographing apparatus stores a file.

16. The method of claim 15, wherein the file storage setting is a setting for automatically setting filenames of files stored in the digital photographing apparatus based on user information of the identified user.

17. The method of claim 12, wherein, if a plurality of device information are received from a plurality of mobile terminals, the recognizing of the user comprises:
displaying user information corresponding to device information regarding identified users from the plurality of received device information;
receiving a selection for one of the plurality of displayed user information; and
identifying the user registered to the digital photographing apparatus based on the selected user information.

18. The method of claim 12, wherein, if a plurality of device information are received from a plurality of mobile terminals, the recognizing of the user comprises:
- determining reception sensitivities of the respective device information regarding registered users from among the plurality of received device information;
- automatically selecting device information regarding the mobile terminal with the highest reception sensitivity; and
- identifying the user registered to the digital photographing apparatus based on the automatically selected device information.

19. The method of claim 12, wherein the receiving of the input comprises receiving at least one piece of information selected from the group consisting of a fingerprint of the user and a face image of the user.

20. The method of claim 12, further comprising performing a user registration to the digital photographing apparatus, wherein the performing of the user registration comprises:
- executing an user registration application installed on the digital photographing apparatus;
- receiving input of user identification information and corresponding user information; and
- storing the user identification information and the user information as a user profile.

21. The method of claim 12, further comprising, when the digital photographing apparatus is turned off, storing a current setting information by associating the current setting information regarding the digital photographing apparatus to the identified user.

22. The method of claim 12, further comprising, when the digital photographing apparatus is turned off, storing a current setting information by performing a user registration and associating the current setting information regarding the digital photographing apparatus to the registered user.

23. A non-transitory computer readable recording medium having recorded thereon a computer program executable by a processor for implementing the method of claim 12.

* * * * *